United States Patent
Bijor et al.

(10) Patent No.: US 9,965,783 B2
(45) Date of Patent: May 8, 2018

(54) USER CONTROLLED MEDIA FOR USE WITH ON-DEMAND TRANSPORT SERVICES

(71) Applicant: Uber Technologies, Inc., San Francisco, CA (US)

(72) Inventors: Rahul Bijor, San Francisco, CA (US); Conrad Michael Whelan, San Francisco, CA (US); Paul-Phillip Holden, San Francisco, CA (US); Kyle James Kirwan, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 433 days.

(21) Appl. No.: 14/333,352

(22) Filed: Jul. 16, 2014

(65) Prior Publication Data
US 2015/0228000 A1  Aug. 13, 2015

Related U.S. Application Data

(60) Provisional application No. 61/937,456, filed on Feb. 7, 2014.

(51) Int. Cl.
*G06Q 10/02* (2012.01)
*G06Q 30/06* (2012.01)
(Continued)

(52) U.S. Cl.
CPC ......... *G06Q 30/0613* (2013.01); *G06Q 50/10* (2013.01); *H04W 4/021* (2013.01); *H04W 12/06* (2013.01); *H04L 67/12* (2013.01)

(58) Field of Classification Search
CPC .... G06F 21/10; H04B 1/082; G06Q 30/0613; G06Q 50/10; H04W 4/021; H04W 12/06; H04L 67/12
(Continued)

(56) References Cited

U.S. PATENT DOCUMENTS 6,874,037 B1 * 3/2005 Abram .................. H04L 7/10
709/248
8,489,119 B1   7/2013 Fraccaroli
(Continued)

FOREIGN PATENT DOCUMENTS

KR  10-2012-0090480   8/2012
WO  WO-2009023295 A2 *  2/2009 ............ H04L 67/06

OTHER PUBLICATIONS

Branscombe, M.; "Use your phone to control your car using MirrorLink" (Aug. 1, 2012); Tech Radar, pp. 1-2, http://www.techradar.com/news/car-tech/use-your-phone-to-control-your-car-using-mirrorlink-1090628 (Year: 2012).*
(Continued)

*Primary Examiner* — Michael P Harrington
*Assistant Examiner* — Bryan J Kirk
(74) *Attorney, Agent, or Firm* — Mahamedi IP Law LLP

(57) ABSTRACT

A method for providing media for use with on-demand transport services is provided. A transport service is arranged for a user. The user is determined to have requested control over media to be outputted on an output device of the driver. A token of the user is identified and transmitted to the driver's computing device. In response to detecting that an event has occurred for enabling the user to control the media, the driver's computing device is enabled to output the media that is controlled by the user operating the user's computing device.

20 Claims, 13 Drawing Sheets

(51) Int. Cl.
*H04W 4/02* (2018.01)
*H04W 12/06* (2009.01)
*G06Q 50/10* (2012.01)
*H04L 29/08* (2006.01)

(58) Field of Classification Search
USPC .......................................................... 705/13
See application file for complete search history.

(56) References Cited

U.S. PATENT DOCUMENTS

| | | | |
|---|---|---|---|
| 8,909,256 | B2 | 12/2014 | Fraccaroli |
| 2007/0265974 | A1* | 11/2007 | Chang ..................... G06F 21/10 705/57 |
| 2009/0049119 | A1 | 2/2009 | Marcinkiewicz et al. |
| 2010/0198428 | A1 | 8/2010 | Sultan et al. |
| 2010/0260350 | A1 | 10/2010 | Chutorash |
| 2011/0258623 | A1* | 10/2011 | Wagner ............ H04N 21/41407 718/1 |
| 2012/0203599 | A1 | 8/2012 | Choi |
| 2013/0074111 | A1 | 3/2013 | Hyde et al. |
| 2013/0316727 | A1* | 11/2013 | Edge ........................ H04W 4/02 455/456.1 |
| 2014/0149544 | A1* | 5/2014 | Le Nerriec ........... G06F 3/0484 709/217 |
| 2014/0164559 | A1* | 6/2014 | Demeniuk ............. H04B 1/082 709/217 |
| 2017/0193404 | A1* | 7/2017 | Yoo ........................ G06Q 10/02 |

OTHER PUBLICATIONS

Dillow, C.; "Without Smarts, New York's 'Taxi of Tomorrow' is Really the Taxi of Yesterday" (Apr. 10, 2012); Popular Science, https://www.popsci.com/cars/article/2012-04/without-connectivity-new-yorks-new-taxi-tomorrow-really-taxi-yesterday (Year: 2012).*
International Search Report dated May 13, 2015 in PCT/US2015/014743.

* cited by examiner

USER CONTROLLED MEDIA FOR USE
WITH ON-DEMAND TRANSPORT SERVICES

RELATED APPLICATION

This application claims benefit of priority to U.S. Provisional Patent Application No. 61/937,456, filed Feb. 7, 2014, titled USER CONTROLLED MEDIA FOR USE WITH ON-DEMAND TRANSPORT SERVICES; the aforementioned application being incorporated by reference in its entirety.

BACKGROUND

On-demand services, such as on-demand transport services, can be requested and arranged through the use of mobile computing devices. For example, a user can operate his or her computing device to make a request for a transport service and a transport arrangement system can select a driver for that user.

DETAILED DESCRIPTION

Figure 1:
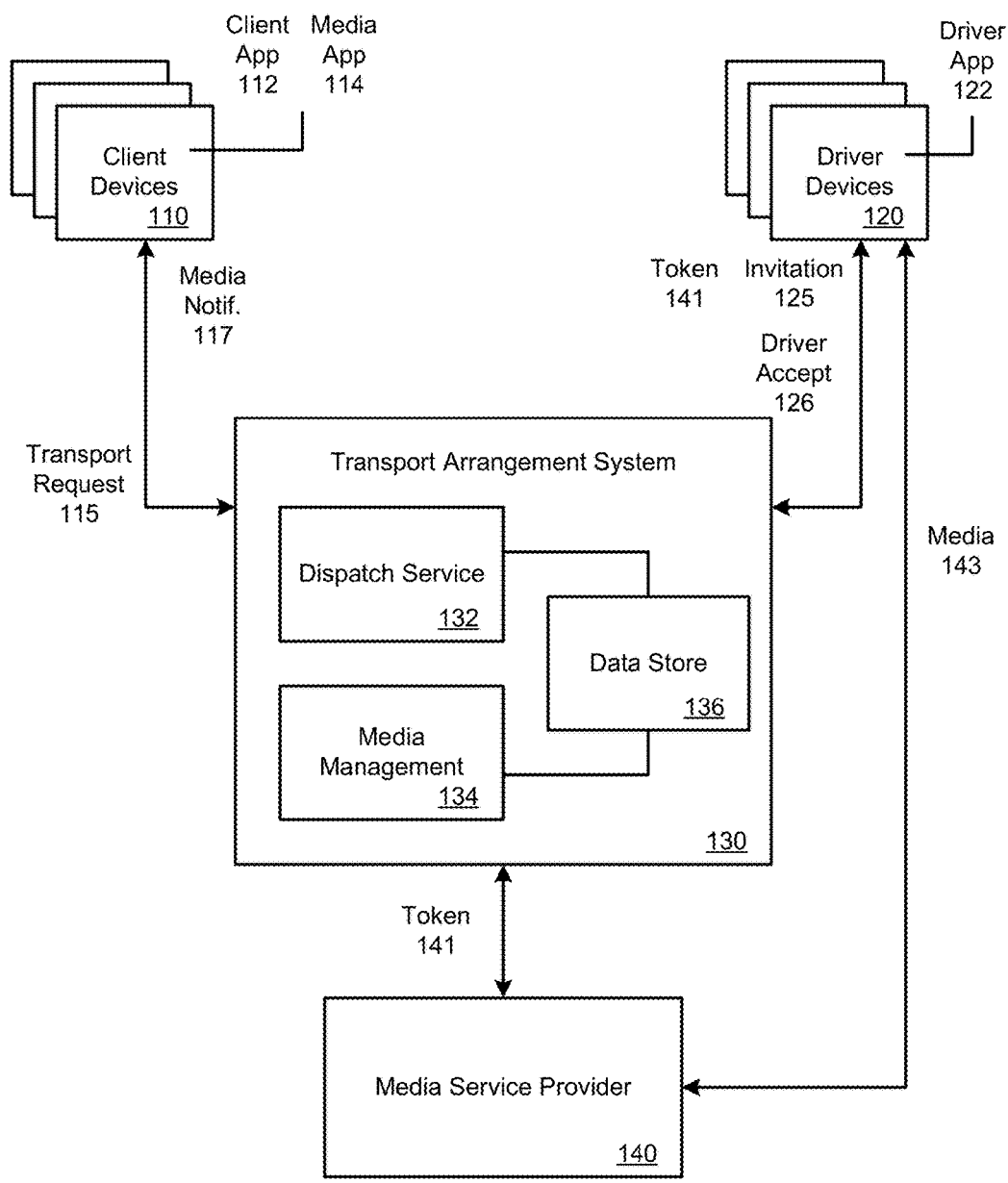
FIG. 1 illustrates an example system for providing media for use with on-demand transport services.

Examples described herein provide for a system and method for enabling a user to utilize the user's own network service to control the output of media in a public setting. According to some embodiments, a transport service can be arranged for a user (e.g., taxi, limousine or black cab, multi-user passenger van, etc.). A device of the user can communicate with an audio system of the transport vehicle in order to control the use and output of media from a network service using the account of the user. In this way, examples described herein provide a mechanism to enable the user to control the media being outputted (or played) in the driver's vehicle during the duration of the transport service.

In some examples, the system enables the user to have control over the media being outputted in the vehicle so that the user may have a personalized media experience from the start of the transport service (e.g., from pickup or just before pickup) to the end of the transport service (e.g., to drop off or just before drop off). The user can operate his or her device as a master device and have temporary control over at least a functionality of the driver's computing device using one or more network services. In this manner, the user can control what music is played during the transport service, thereby providing the user with an enhanced transport experience.

One or more network services can enable the user to operate and provide inputs to one or more applications running on the user's client device. Input that is provided via an application, such as a media application or an on-demand service application that includes media functionality, can be conveyed through the one or more network services to the driver's device to control at least a portion of a media application or an on-demand service application on the driver's device. For example, the media application can enable the user to select a song, artist, or playlist, or search criteria for determining what media is outputted on the driver device. Typically, a user can operate the application on her device in order to output media using a speaker or headphone that is coupled to the user's device (e.g., the integrated speaker of the device, a wirelessly connected portable speaker, earphones, etc.). By providing the user with the option to have media control during a transport service, the user can operate the media application on the user device to output the media using the audio system of the vehicle (which can communicate with the driver's device rather than the user device).

In some examples, the system, such as a transport arrangement system, can arrange a transport service for a user and a driver. Once the transport service is arranged for the user and the driver, the system can determine if the driver has enabled media control for the user. As described herein, enabling "media control" for a user refers to enabling the user to operate the user's computing device in order to control the output of media on the driver's computing device. The driver's device can output media based on inputs provided by the user on the user's device. In one example, the driver can operate a designated driver service application on his or her mobile computing device to configure settings to allow the user to have media control over media being played in the driver's vehicle and/or to prevent the user from having media control (e.g., the driver wants to have control).

According to an example, if the driver has enabled media control on the driver's device, the system transmits a message to the user's device to notify the user that the user can control the media in the vehicle during the transport service. In some examples, the user can operate any one of a plurality of media applications, such as video applications, music applications for streaming media, the designated service application that includes media functionality, etc., on his or her device. As referred to herein, a media application can be an application that is provided by a third-party media service provider (e.g., Pandora®, Spotify®, Rdio®, Youtube®, etc.)

that is separate from the transport service system or provider. In one example, the media application can interface with or be a part of the designated service application so that a user can operate the service application to communicate with the corresponding third-party media service provider. Still further, in another example, the designated service application can provide media functionality independent of the third-party media service provider so that the transport arrangement system can provide media without relying on the third-party media service provider (e.g., through an arrangement with a record label company, or media studio, etc.).

A user can have a subscription or an account with a third-party media service provider (or with multiple providers), in which the user can access, control, and consume (e.g., watch or listen to) media using her device. Users can already have accounts with the third-party media service providers to enjoy music and other media on their computing devices. As discussed, examples provided herein enable a user to consume media on her computing device and continue the user's enjoyment of such services seamlessly when entering a public environment, such as a vehicle. According to an example, a user can link the user's account with the transport service system with the user's account with the third-party media service provider. The user can subscribe to the media control feature using the designated service application on her device by providing a credential (e.g., a user name and password) for the media service provider to the transport service system. The system can store the credential as a token associated with the user in a memory resource. The token can be encrypted and/or protected, for example, and used by the system to enable the driver's mobile computing device to be controlled by the user's mobile computing device.

In one example, the system can determine that the user has requested to operate the media application on her device to control media to be outputted on an output device of the driver, such as the speakers of the driver's vehicle, during a duration of the transport service. The system can identify the user's token associated with the user's media service account, and transmit the token to the driver's device. In this manner, the driver's device can use the user's token to play or output the media associated with the user's account. The driver's mobile computing device can be coupled (e.g., using an auxiliary cable or via Bluetooth) to a speaker system, such as the speakers of the vehicle or another speaker source (e.g., a portable speaker system), thereby enabling the user's media to be played back by speakers coupled to the driver's device. When media control is enabled for the user and the user chooses to use the media control feature, the user can operate the media application on her device to cause the driver's device to output the media. In this manner, the user can listen to her music streamed by the media service provider (and can also control the music being played back using the media application on her device) using the driver's speakers during the transport service.

According to some examples, the system does not enable the user to have media control until the transport service has begun (or just before the transport service has begun). For example, the system does not allow the user to play her music in the driver's vehicle until she is picked up by the driver or just before she is picked up (e.g., so that when she opens the door to the vehicle, her music is already playing). The system can detect or determine that an event has occurred for enabling the user to control the media to be outputted on the output device of the driver. Depending on implementation, the event can correspond to the driver providing input via the driver's designated service application indicating to the system (e.g., by sending a message from the driver's device over a network to the system) that the driver is "arriving now" (or is close to picking up the user) or that the driver is "beginning the trip" (or has initiated the transport service).

In other examples, the event can be detected in response to the user's device or driver's device being within a predetermined proximity of one another. Proximity can be determined using one or more of (i) GPS information corresponding to the current locations of the devices, or (ii) device aware resources, local on the respective devices, such as Bluetooth or other short-range wireless receivers (e.g., Wi-Fi), which detect other devices when in range (e.g., within ten feet). The system can detect the occurrence of the event by determining the distance between the current locations of the user's device and the driver's device (e.g., the proximity) and comparing the distance to a threshold distance. If the distance is less than the threshold distance, the system can determine that the devices are proximate to each other and determine that the transport service is about to begin. In the case where proximity is detected using wireless receivers of the respective devices, one or both devices can make the proximity detection and then communicate the determination to the system. For example, the event can be determined in response to the user's device and/or driver's device broadcasting a wireless signal to the other (e.g., such as wireless signals transmitted using Bluetooth) and determining a distance between the devices (e.g., using time of arrival or signal strength measurements). When a predefined proximity is detected, the user's device and/or driver's device can notify the system of the event, and the system can determine that the transport service is about to begin.

In response to determining the occurrence of an event, the system can cause the driver's computing device to output media (and therefore, output the media to the speakers of the vehicle) that is controlled by the user via the media application on the user's mobile computing device. The driver's computing device can receive media from the media service provider or the system (depending on implementation) based on input or parameters specified with the user's account (e.g., based on input received from the user's interaction with the media service provider on the user's device). The system can also determine another event or trigger for terminating a user's media control of the driver's output system (e.g., based on the driver providing input that the transport service has been completed, or based on distance of the user and driver's mobile computing devices being greater than a threshold distance). In this manner, the user can have full control over the music, for example, that is being played in the vehicle for the duration of the transport service.

As used herein, a client or user device, a computing device, a mobile computing device, a driver device, a driver computing device, etc., refers to devices corresponding to desktop computers, cellular devices or smartphones, tablets, laptop computers, tablet devices, etc., that can provide network connectivity and processing resources for communicating with the system over a network. A driver device can also correspond to taxi meters, other metering devices of a transit object, or custom hardware, etc.

Although examples described herein relate to media service providers and media applications, other examples of providers and applications can be used in the system. For example, the user can operate any one of a messaging application, a social networking application, a game application, a financial application, etc., and provide input to control one or more aspects of the service application (which includes one or more frameworks for communicating with the one or more service providers for those applications) of the driver's device.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example system for providing media for use with transport services. The system can include a plurality of client devices 110 (e.g., mobile computing devices operated by clients or users/customers) and a plurality of driver devices 120 (e.g., mobile computing devices operated by drivers) that are in communication with a transport arrangement system 130 over one or more networks. Each of the client devices 110 and the driver devices 120 can store a designated client service application 112 or a designated driver service application 122, respectively. For example, a user can operate the designated service application 112 to make a request for a transport service and receive indication about the status of the transport service. The client device 110 can also include one or more media applications 114, such as a music streaming application. Depending on implementation, the media application 114 can be a standalone application that is separate from the designated service application 112 or be a part of the designated service application 112. The media application 114 can communicate with a media service provider 140 over one or more networks (and/or via the transport arrangement system). In other examples, the designated service application 112 can include media functionality (e.g., functionality similar to that provided by a media application) that enables the transport arrangement system 130 to provide media for consumption by the user.

Similarly, depending on implementation, the driver device 120 can include a media application that communicates with the media service provider 140 (not shown in FIG. 1). The media application can be a standalone application that is separate from the designated service application 122 or be a part of the designated service application 122. In another example, such as the example shown in FIG. 1, the designated driver service application 122 can include a software development kit for the media application (e.g., a music streaming application) that can communicate with the media service provider 140 (and/or for other media applications).

Depending on implementation, one or more components of the transport arrangement system 130 can be implemented on a computing device, such as a server, laptop, PC, etc., or on multiple computing devices that can communicate with driver devices and client devices over one or more networks. In some examples, a computing device can operate or execute an application to perform one or more of the processes described by the various components of the transport arrangement system. The transport arrangement system 130 can also be implemented through other computer systems in alternative architectures (e.g., peer-to-peer networks, etc.).

The transport arrangement system 130 can communicate, over one or more networks via a network interface (e.g., wirelessly), with driver devices 120 using a driver device interface and client devices 110 using a client device interface. The device interfaces (not shown in FIG. 1) can enable and manage communications between the transport arrangement system 130 and each of the client and driver devices 110, 120. In some examples, the client devices 110 and the driver devices 120 can individually operate a designated service application 112, 122, respectively, that can interface with the device interfaces to communicate with transport arrangement system 130. According to some examples, the service applications 112, 122, can include or use an application programming interface (API), such as an externally facing API, to communicate data with the device interfaces of the transport arrangement system 130. The externally facing API can provide access to transport arrangement system 130 via secure access channels over the network through any number of methods, such as web-based forms, programmatic access via restful APIs, Simple Object Access Protocol (SOAP), remote procedure call (RPC), scripting access, etc.

The transport arrangement system 130 can include a dispatch service 132 that receives a transport request 115 from a user's client device 110 and selects an appropriate driver for that user. The dispatch service 132 transmits an invitation message 125 to a selected driver's device 120 asking the driver whether or not the driver wants to provide transport for that user. The driver can provide an acceptance 126 to the dispatch service 132. Once the transport service has been arranged for the user, the dispatch service 132 can notify the user that the driver has been selected and is en route to a pickup location designated by the user.

The transport arrangement system 130 can also include a media management component 134. According to some examples, the media management component 134 can provide the user with a mechanism to play back media using the driver's device resources when the user is provided the transport. The dispatch service 132 can notify the media management component 134 which driver is providing the transport service (e.g., provide the driver's identifier). The media management component 134 can use the driver's identifier to access the driver's profile to determine if the driver has enabled media control. For example, drivers' information (e.g., profile or account) can be stored in a data store 136 of the transport arrangement system 130 so that the media management component 134 can determine whether the driver is first enabled to provide the user with media control and/or whether the driver has chosen to allow or prevent the user from having media control. Depending on the situation, a driver may or may not have her driver device 120 equipped for providing a user with media control. For example, for the driver to be equipped with providing a user with media control, the driver may connect her driver device 120 with the driver's output device (e.g., speakers) and have the media control feature enabled with the driver's account or profile (e.g., by toggling a settings features using the driver's service application 122).

In one example, the dispatch service 132 can be in communication with the media management component 134 and/or the driver database to identify which drivers (e.g., in a particular geographic region) have media control capabilities and/or have enabled media control. The dispatch service 132 can communicate information about which vehicles or drivers can provide media control to the designated service application 112 running on client devices 110. The designated service application 112 on a client device 110 can provide a user interface feature, such as a marker or in-application notification, that indicates to a user that vehicles in that geographic region have media control capabilities (and/or other augmented capabilities). According to an example, when making a transport request 115, the user can specifically specify that he or she would like a driver that has media control capabilities by selecting a type of vehicles indicated as having media control capabilities. In such case, the dispatch service 132 can select a driver that can provide media control capabilities.

In some examples, if a selected driver enables the user to have media control, the transport arrangement system 130 (via the media management component 134) can transmit a media notification 117 to the user's client device 110. In one example, the media notification 117 can be provided within or in conjunction with the designated service application 112 to notify the user that the user can link or synchronize the designated service application 112 with a media application 114 on the user's device 110, so that the user can listen to or view media using the output device(s) of the vehicle. While the user waits for the transport service (e.g., waits for the driver to arrive), for example, the user can perform a simple, one-time link of their designated service application 112 with a media application 114, such as a music streaming application (provided by a media service provider, e.g., Rdio®, Spotify®), if necessary. An example of the media notification 117 can be seen in FIG. 8A. If the user has already synchronized the service application 112 with the media application 114, the user can choose to have media control by selecting a feature on a user interface of the service application 112 ("Accept").

In order for the user to sign up or subscribe to the media control feature, the user can provide a credential for the user's account with the media service provider to the media management component 134. For example, the user may already have an account that is set up with a media service provider 140 that provides the media application 114 on the client device 110. As a result, the user can input the user's known credential in an interface provided by the service application 112. The credential can correspond to the user's user name, ID, or email address, and a password, for example. The media management component 134 can store the user's credential as a token 141 in the data store 136 along with the user's account or profile with the transport arrangement system 130. In one example, the media management component 134 can communicate with the media service provider 140 using the user's token 141 to authenticate the user with the media service provider 140.

Once the designated client service application 112 is linked with the media application 114 (e.g., the user's transport service account and the user's media service account is linked), the media management component 134 can access the token 141 for that user and provide the token 141 (or an associated temporary token) to the driver device 120 when the user requests media control. The media management component 134 can provide the token 141 to the driver device 120 of the driver that has been arranged to provide the transport service for the user. In this manner, the driver device 120 can now act as a slave device for the user's client device 110 during the transport service. User inputs provided on the user's client device 110 can be provided to the media service provider 140, and the media service provider 140 can cause corresponding actions to be performed on the driver device 120, thereby giving the user's device client 110 control over a functionality of the driver device 120 (e.g., the media play back functionality).

According to some examples, the media management component 134 determines a time when the user is to have media control, e.g., at the start of the transport service or just before the user is picked up. For example, the media management component 134 does not enable the user to have control over the media output of the driver's device or vehicle until a time the transport service has begun (or just before). The media management component 134 can prevent the user from playing her music in the driver's vehicle, for example, until she is picked up by the driver or just before she is picked up (e.g., so that when she opens the door to the vehicle, her music is already playing). The media management component 134 can interact with other components of the transportation arrangement system 130 (not shown in FIG. 1) to determine or detect whether an event has occurred for enabling the user to control media to be outputted on the output device of the driver.

Depending on implementation, an event can correspond to receiving data, a signal, or a message from the client device 110 and/or the driver device 130. For example, the event can correspond to the driver providing input via the driver's service application 122 indicating to the transport arrangement system 130 (e.g., by sending a message from the driver's device over a network to the system) that the driver is "arriving now" (or close to picking up the user), or that the driver is "beginning the trip" (or has initiated the transport service).

According to other examples, the event can be detected in response to the user's device or driver's device being within a predetermined proximity of one another (e.g., determined using GPS information corresponding to the current locations of the devices and comparing the distance between them to a threshold distance). The media management component 134 can communicate with a location monitoring component of the transport arrangement system 130 to receive the GPS information from the client device 110 and the driver device 120, and determine their proximity.

In another example, the event can be determined in response to the client device 110 and/or the driver device 120 broadcasting a wireless signal to the other and determining a distance between the devices. When the distance is equal to or less than a predefined distance, the client device 110 and/or the driver device 120 can determine that the two devices are proximate to each other and notify the media management component 134 of the event. In response to determining the event, the media management component 134 can then cause the driver device 120 to output media that is controlled by the user via the media application 114 on the user's device 110 (and therefore, output the media to the speakers of the vehicle).

In one example, the media management component 134 can signal or transmit a message to the service application 122 on the driver device 120 indicating that the media control has been given to the user. The driver's service application 122, which includes the software development kit for a media application associated with the media service provider 140, can use the user's token 141 to communicate with the media service provider 140 over one or more networks (either directly or via the media management component 134, depending on implementation). As discussed, according to some examples, the user's token 141 can be provided to the driver's service application 122 in response to the user indicating that he or she wants media control. The driver's device 120 can receive the media 134 associated with the user's media service account, such as a song or a playlist of songs.

The user can operate the media application 114 on her client device 110 to play, arrange, and/or queue up a song(s) or playlist(s) from the media application 114. When the user provides inputs by operating the media application 114, the associated media service provider 140 can receive the inputs from the media application 114, and cause the appropriate media 143 (such as a particular song) to be provided or streamed to the driver's device 122. The driver's media application (not shown in FIG. 1) or service application 122, which interfaces with a media application or includes the software development kit for the media application, can communicate with the media service provider 140 using the token 141 and play back the media 143. Because the driver's device 120 can be connected to an output device in the driver's vehicle (via an auxiliary cable, cassette tape cable, or wirelessly through Bluetooth, etc.), when the media 143 is provided to the driver's device 143, it can be played using the output device in the driver's vehicle (e.g., speakers). In this manner, the driver does not have to control the music and/or video for the user (e.g., other than adjusting the volume of the speakers), but instead, the user can have control over the media 143 that is played back during the duration of the transport in order to personalize the transport service for the user. When the user changes the media 143 to be played back using the media application 114, the media service provider 140 can cause the media 143 that is provided to the driver's device to also be changed accordingly. This provides the user with seamless control over the media 143 as if the user was listening to music, for example, in his or her own vehicle.

Once the transport service is complete, the user can be prevented from having media control of the driver's device or vehicle. The media management component 134 can detect triggers or events that indicate that the media control is to be relinquished back to the driver. Depending on examples, the event can correspond to (i) the driver providing an input using the driver's service application 122 specifying that the transport service has been complete, (ii) the transport arrangement system 130 determines that the locations of the driver's device 120 and the client's device 110 has a distance that is greater than or equal to a threshold distance, thereby indicating that the user is no longer in the driver's vehicle, (iii) the user providing an input using the user's client service application 112 specifying that the user no longer wants media control, or (iv) the user's device 110 and/or driver's device 120 broadcasts a wireless signal to the other and determines a distance between the devices and that the distance is greater than or equal to a threshold distance, and notifies the transport arrangement system 130 of the event. In response to detecting the event, the transport arrangement system 130 can notify the driver's service application 122 to delete or remove the user's token 141. Deleting or removing the token 141 can revoke the user's media control. In another example, the transport arrangement system 130 can communicate with the media service provider 140 indicating that the driver's service application 122 is to no longer play or output the user's selected media 143. The media service provider 140 can then revoke the token 141 from the driver's device 120.

In some variations, a driver can have an account with a media service provider 140 and operate an associated media application on the driver device 120. The driver's account can be accessible by the transport arrangement system 130 so that the transport arrangement system 130 can provide songs and/or a playlist(s) of songs, in connection with the media service provider 140, to both the media application 114 on the client device 110 and the media application on the driver device 120. For example, the transport arrangement system 130 can preload one or more playlists to be played back on the driver's device. The media service provider 140 can provide different playlists specified by the transport arrangement system 130 (e.g., by a user of the system 130) to different cities or geographic regions (e.g., a particular playlist for San Francisco, Calif., another playlist for Austin, Tex.). The playlists(s) can be made available to users' accounts and/or drivers' accounts of users and/or drivers, respectively, that are in a geographic region. In this manner, when the user is in a particular city, a different playlist (e.g., localized mix) can be made available to the user, the user can select a playlist that the user wants to listen to during the transport service, and the user can have media control over the music being played in the driver's vehicle.

As an addition or an alternative, without giving the user full media control, the media management system 130 can enable the user to send or share a playlist of the user's account (e.g., a user-configured playlist) with the driver device 120. A user can configure a playlist of songs using a media application or the service application. The playlist can be associated with the user's account with the media service provider 140 or the transport service system 130. Instead of allowing the user to have full media control, the transport service system 130 can enable partial control by allowing the user to share the user's playlist (or a selected album or radio station, etc.) with the driver device 120. In one example, the media application or the service application on the driver's device can display a notification that the user requests to play back media from the user's playlist. The driver can then select a feature on a user interface to view the user's playlist and select a media item to play back. In this manner, the driver can have control over song selection or volume by operating the playlist from the driver device 120.

Although an example of FIG. 1 illustrates one media service provider 140, in other examples, multiple media service providers and multiple media service applications can be used with the system as described. In addition, depending on implementation, the client device and/or the driver device can store and operate any one of a respective service application, a respective service application that includes a software development kit for a media service provider, or one or more media applications associated with one or more media service providers.

Methodology

Figure 2A:
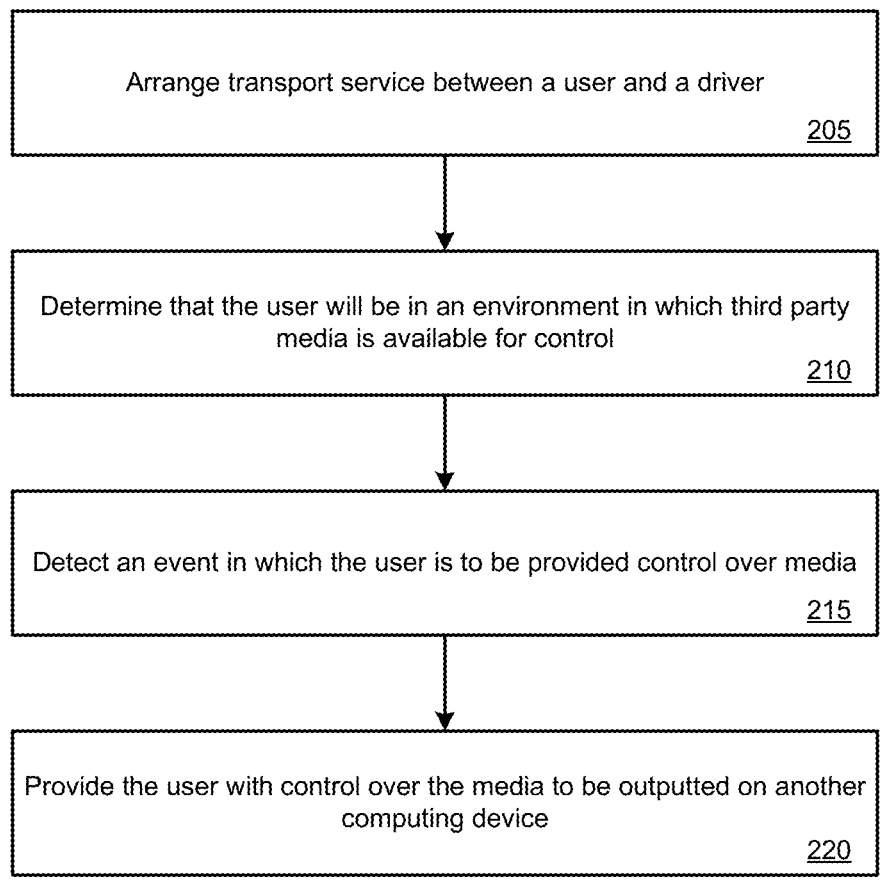
FIGS. 2A and 2B illustrate example methods for providing media for use with on-demand transport services.
Figure 2B:
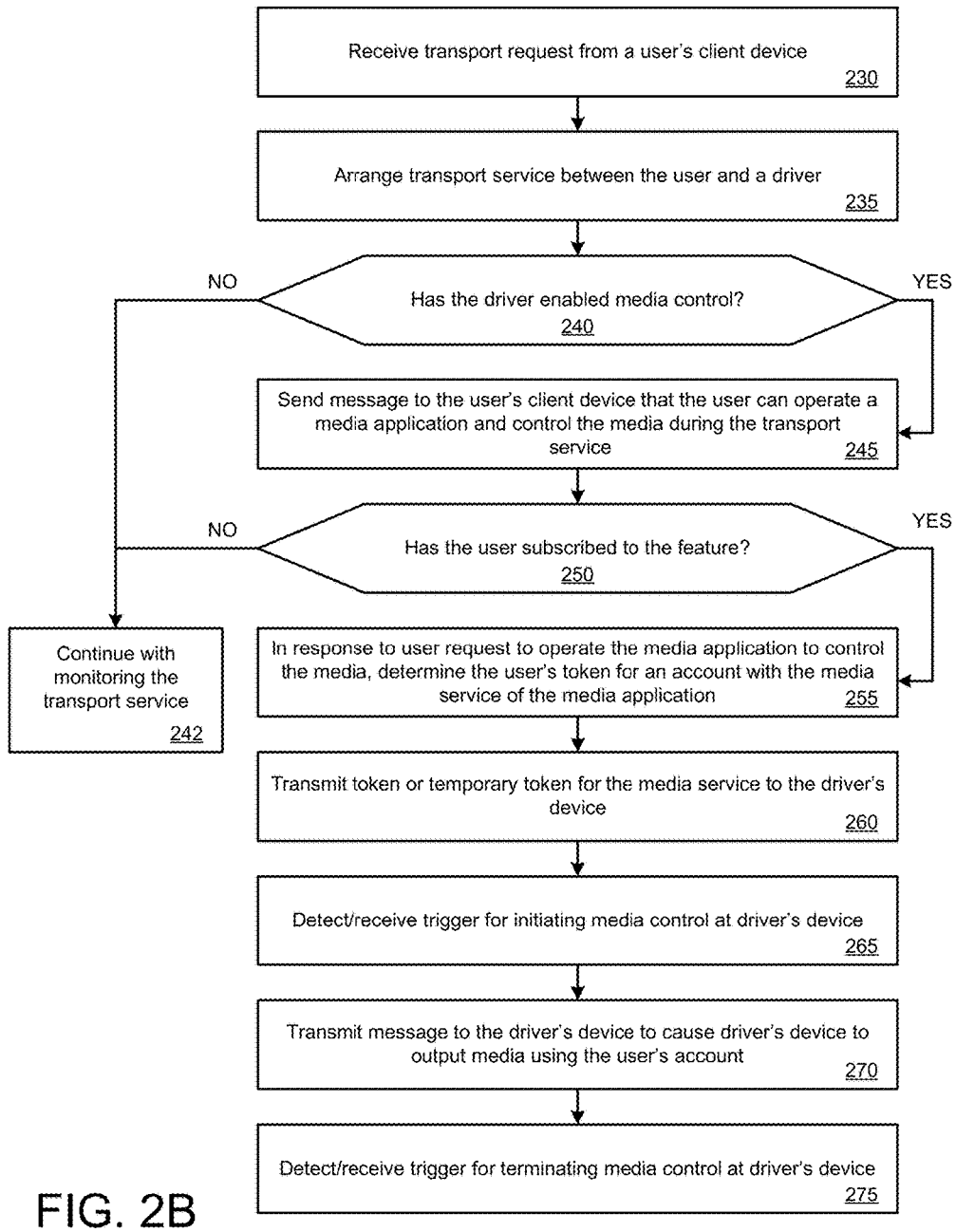

FIGS. 2A and 2B illustrate example methods for providing media for use with on-demand transport services. A method such as described by examples of FIGS. 2A and 2B can be implemented using, for example, components described with an example of FIG. 1. Accordingly, references made to elements of FIG. 1 are for purposes of illustrating a suitable element or component for performing a step or sub-step being described. In some examples, FIGS. 2A and 2B can also include additional or different steps or operations not illustrated in FIGS. 2A and 2B, such as operations described in examples of FIG. 1 and FIGS. 3 through 10.

Referring to FIG. 2A, the transport arrangement system 130 can arrange a transport service to be provided for a user (205). The system 130 can receive a request for a transport service from the user's client device 110 and select a specific driver to provide the transport service for that user. One the transport service is arranged for the user, the system 130 can determine that the user will be in an environment in which third party media is available for control (210). In one example, the system 130 can access a driver database to determine whether the selected driver is capable of providing media control for a user during the transport service and/or whether the selected driver has enabled media control in the driver's profile. The system 130 can determine that the driver has enabled media control, thereby determining that the user will be in an environment in which media is available for control by the user.

According to some examples, the system 130 can also determine whether the user has subscribed to the media control feature by accessing a user database. If the user has subscribed to the media control feature, the user can control media by operating his or her device and based on the user's input, control the media to be outputted via the driver's computing device. If the user has not yet subscribed to the media control feature, the system 130 can provide a message to the user's device notifying the user of the media control feature and/or prompting the user to subscribe to the media control feature. The user can subscribe to the media control feature by following instructions provided by a set of user interfaces of the designated client application 112.

The system 130 can determine whether an event has occurred in which the user is to be given control over the selection and output of media using the driver's device (215). The detection of the event can be a trigger in which the system 130 passes control of the output of media from the driver's device 120 to the client's device 110. For example, while the user is waiting for the driver for pick up, the user can continue to consume media on her client device 110 using the media application 114. Typically, the media can be outputted to a speaker or earphones connected to the client device 110. When the system 130 detects the event (e.g., the driver is about to pick up the user or the client device 110 and the driver device 120 are within proximity of one another), the system 130 can then provide the user with control over the media to be outputted to the driver's device (220).

At this point, the service application 112 and/or the media application 114 causes the user's client device 110 to cease outputting the media to the speaker or earphones connected to the client device 110, but instead causes the media to be outputted to the driver's device 120. The driver's device 120 can then use the user's account with the media service provider and output the user-controlled media. The driver's device 120 can be connected (e.g., wirelessly or via a wire) to the speakers of the vehicle, for example, thereby enabling the media to be outputted to the speakers of the vehicle. In this manner, the user can control the media to be outputted using the media application 114 on her client device 110 and can seamlessly continue to consume the media using the speakers of the vehicle when entering the public environment, e.g., the vehicle.

FIG. 2B illustrates another example method for providing media for use with on-demand transport services. In FIG. 2B, the transport arrangement system 130 can receive a request for transport service from a user's device (230). The request can include the user's identifier associated with the user's account and a pickup location. The dispatch system 132 can arrange the transport service between the user and an available driver (235). In one example, the dispatch system 132 arranges the transport service by selecting a driver from a plurality of drivers based on the user's pickup location, transmit an invitation to the selected driver, and receiving an acceptance to provide the transport service for the user.

In some examples, the transport arrangement system 130 determines whether the driver has enabled media control (and is capable of providing media control) (240). The media management component 134 of the transportation arrangement system 130 can access the driver's account or profile to determine whether the driver has enabled media control. The driver can access his or her profile/account with the transportation arrangement system 130 to change a settings feature indicating whether the driver wants to allow a user to play media in his or her device. In one example, the driver may also be incapable of providing media control if the driver is operating an older version of a driver's service application (or does not have the software development kit for a media application), or if the driver does not have an output device (e.g., does not have the driver's device connected to a portable speaker system or the speakers of the vehicle).

If the driver has not enabled media control for the user and/or if the driver is not capable of providing media control for the user, the transport arrangement system 130 continues with normal operations for monitoring the transport service (242). The user does not have media control and can be provided the transport service normally. On the other hand, if the driver is capable of providing media control and has enabled media control for the user, the transport arrangement system 130 can transmit a message to the user's client device 110 notifying the user that the user can operate her media application to control the media being outputted or played using the driver's speakers during the transport service (245).

The media management component 134 determines whether the user has signed up for or subscribed to the media control feature (e.g., linked the media application on her device with the designated client service application) (250). If the user has not subscribed to the media control feature and does not want to, the transport arrangement system continues with normal operations for monitoring the transport service (242). For example, the media management component 134 can transmit an in-application message that notifies the user that the user can listen to her own media in the driver's vehicle during the ride. The user may provide an input via the service application that she is not interested. If the user has not subscribed to the media control feature, but wants to subscribe, the user's service application provides user interfaces to enable the user to sign up from her device.

If the user subscribes or has previously subscribed to the media control feature, the user can request to operate the media application on her device to control the media to be played back in the driver's vehicle. When the user makes the request to have media control, the media management component 134 can identify the user's token for the account with the media service provider associated with or that provides the media application (255). The media management component 134 can access a memory resource to identify the user's stored token.

The media management component 134 can transmit the user's token for the media service provider (or, in another variation, a temporary token corresponding to the user's token) to the driver's device (260). The driver's service application, which includes a software development kit for a media application corresponding to the media service provider, can use the token to have access to and/or communicate with the media service provider. In this manner, the driver's service application can have access to media associated with the user's account with the media service provider so long as the driver's service application has the user's token.

Depending on some examples, steps 240-260 of FIG. 2B can be performed any time after the transport has been arranged for the driver and until the transport service has completed. For example, the driver's device can receive the token while the user waits at the pickup location for the driver. The transport arrangement system 130 can detect or receive a trigger corresponding to an event for initiating media control at the driver's device for the user (265). In response, the transport arrangement system 130 can transmit a message to the driver's device to cause the driver's device to output media using the user's account and relinquish media control to the user (270). The driver can agree to or allow the user to have media control at this time (e.g., by providing input responding to the message). The user can control the output of the media and which media to be outputted by operating the media application on her client device, which causes the driver's device to receive the media (e.g., streamed music) from the media service provider based on the user's control. The user can continue to have control until the transport arrangement system 130 detects or receives a trigger corresponding to an event for terminating media control at the driver's device (275). In this manner, the user's client device can behave as a master device in which the user can provide inputs to control the driver's device, which behaves as a slave device, through the use of one or more network services.

For example, the user can have an account with a music streaming network service and have a music application provided by the music streaming network service installed on her device. The driver can have a music application provided by the same music streaming service or a designated service application that interfaces with the music application or has a software development kit for that music application installed on his device. By providing the driver's device with the user's token for the user's account with the music streaming network service, the music application or the designated service application on the driver's device can output the music that the user controls on her device. In another example, the designated service application on each of the user's device and the driver's device can be enabled to provide media, e.g., music, video, playlists, without using a media application provided by a media service provider. In this example, the transport arrangement system 130 can provide the media without relying on a separate media service provider.

The user's interactions with a media application, for example, can cause the media application to communicate with the media service provider, which in turn, conveys data to the media application or the designated service application on the driver's device. In another example, the user can interact with the designated service application, which interfaces with the media application (via APIs), to control the media and communicate with the media service provider (e.g., over the network and/or via the transportation arrangement system 130). In this example, the user can control media from the designated service application without having to separately launch or operate a media application. In other variations, the designated service application can include media control features to enable the user to control the output or streaming of media, e.g., play, pause, select a media, make or manage a playlist, etc., without relying on the services of a media service provider. The transportation arrangement system 130 can provide or stream media over the designated service application without interfacing with the media application (e.g., through agreements with music labels directly).

User Interface Examples

Figure 3:
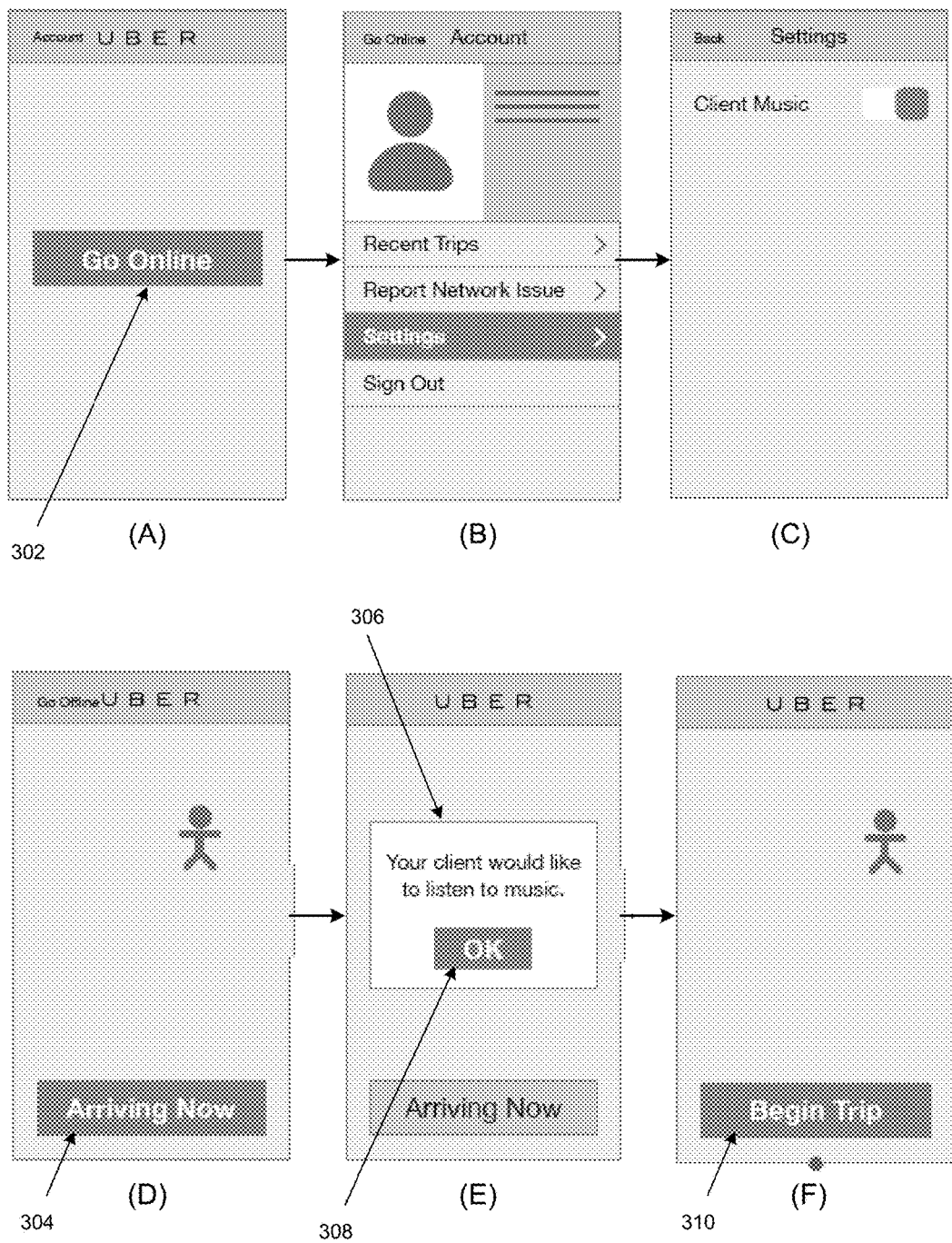
FIG. 3 illustrates example user interfaces that are provided on a display of a driver's mobile computing device to enable user control of media.

FIG. 3 illustrates example user interfaces that are provided on a display of a driver's mobile computing device to enable user control of media. The user interfaces, described by an example of FIG. 3 can be provided on a display of a driver's computing device. In one example, the user interfaces can correspond to user interfaces that are displayed based on a driver's input using a designated driver service application on the driver's mobile computing device.

According to an example, user interface (A) corresponds a user interface in which the driver can select the "Go Online" feature 302 to be on duty or active, for providing transport services to users. Once the driver is on duty, the driver can access her account, shown in user interface (B), to change the driver's account or profile settings. One of the settings in the driver's account or profile can be an indication whether to disable or enable media control for a user, as shown in user interface (C). User interface (D) illustrates the service application when the driver is approaching the pickup location of a user. In this example, the transport service has been arranged for the user and the driver. The driver can select the "Arriving Now" feature 304 to indicate to the user that she is arriving. In one example, selecting this feature can be an event that triggers the transport arrangement system to enable the user to have control. User interface (E) shows a user interface in which the driver is notified of the change in media control from the driver (as a default) to the user (e.g., notification message 306). The driver can select the "OK" feature 308 to enable the user to have the media control. Once the driver picks up the user, the driver can select the "Begin Trip" feature 310, shown in user interface (F), to notify the transportation arrangement system that the transport service has been initiated.

Figure 4:
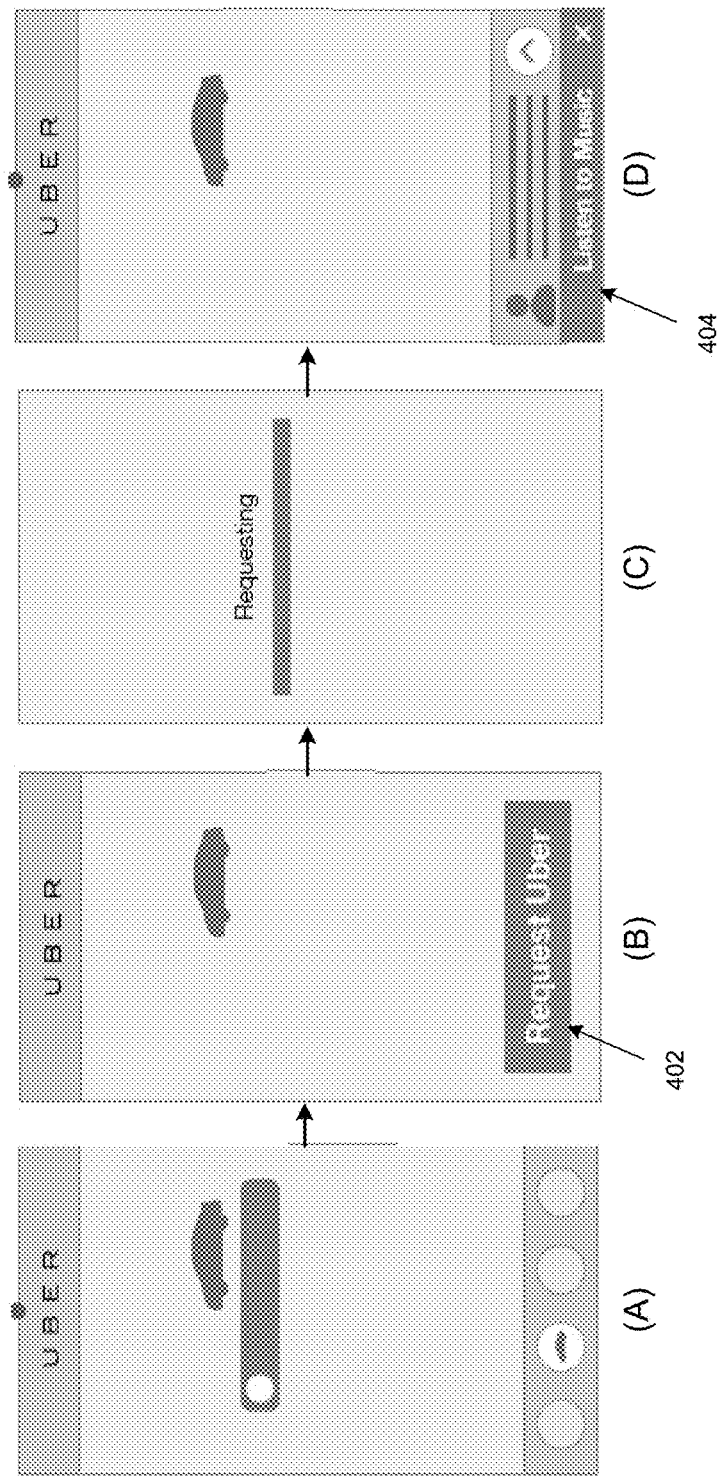
FIG. 4 illustrates example user interfaces that are provided on a display of a user's mobile computing device when the user has signed up or subscribed to the media control feature for use with on-demand transport services.

FIG. 4 illustrates example user interfaces that are provided on a display of a user's mobile computing device when the user has signed up or subscribed to the media control feature for use with on-demand transport services. The user interfaces of FIG. 4 can be provided by a designated client service application that is running on the user's device. According to an example, user interface (A) shows a home page of the user's client service application. The user can select a pickup location, and request a transport service by selecting, for example, a feature 402 (e.g., "Request Uber"), shown in user interface (B). In the example of FIG. 4, the user has already linked at least one media application with the client service application on user's mobile computing device (e.g., has already subscribed to the media control feature provided by the transport arrangement system). After the service is requested and after the service has been arranged (e.g., after user interface (C) showing that the request is being processed), the user is provided with a user interface (D) that shows the current status or driver in route, along with a selectable feature 404 at the bottom, indicating that the user can control media at a later time (e.g., the feature "Listen to Music"). When the user selects the "Listen to Music" feature 404, another user interface can be displayed corresponding to a media user interface to enable the user to control what media to play. Such a media user interface can be provided, at least in part, by the designated client service application in conjunction (via a software development kit or API) with the media application or be provided by the media application.

Figure 5A:
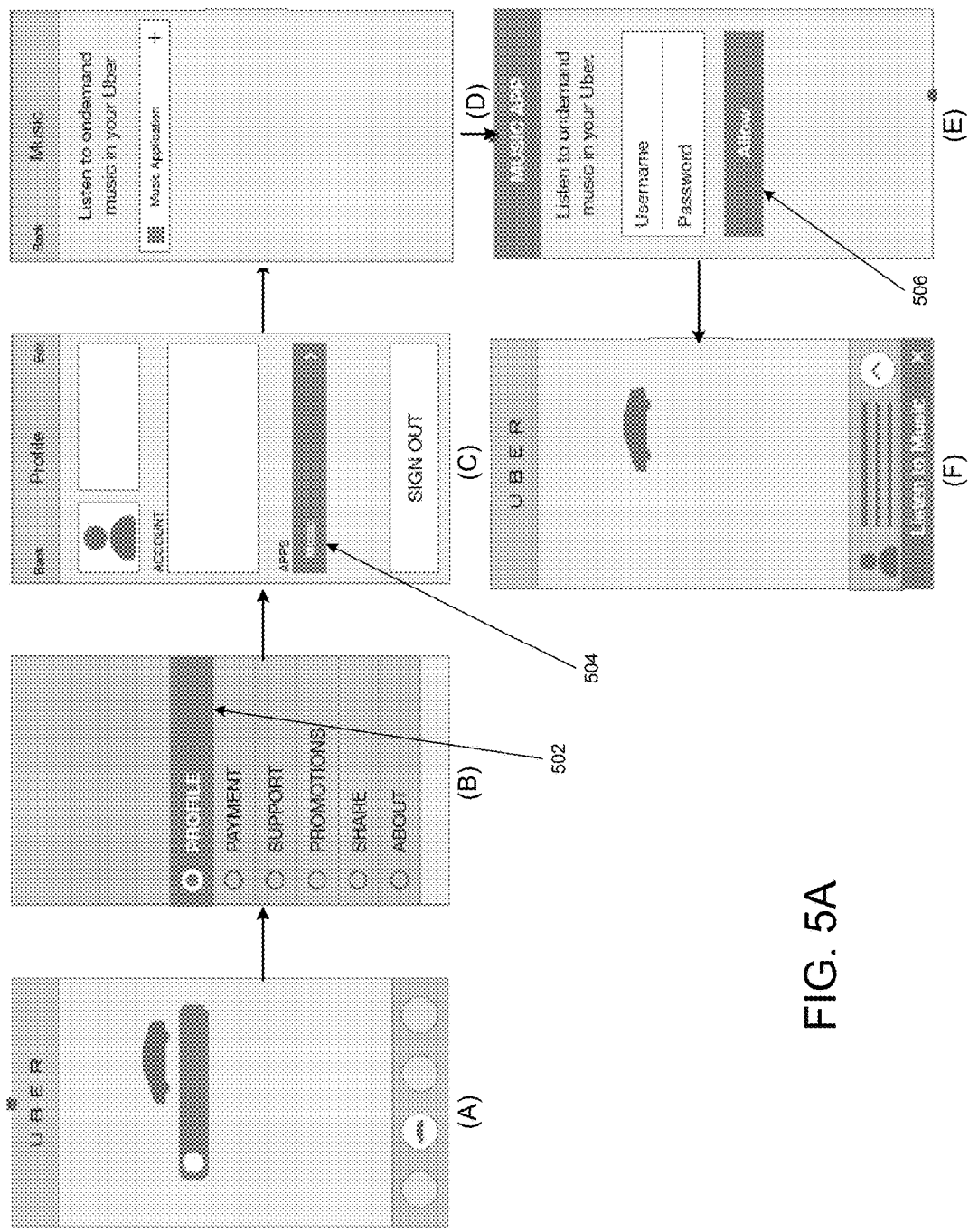
FIGS. 5A and 5B illustrate example user interfaces that are provided on a display of a user's mobile computing device to enable the user to sign up or subscribe to the media control feature for use with on-demand transport services.

FIG. 5A illustrates example user interfaces that are provided on a display of a user's mobile computing device to enable the user to sign up or subscribe to the media control feature for use with on-demand transport services. In the example described in FIG. 5A, the user has not yet linked the media application with the client service application or subscribed to the media control feature. User interface (A) shows a home page of the user's client service application. The user can access a settings feature (not shown in FIG. 5A) that, when selected, displays different options for the user, as shown in user interface (B). When the user selects the "Profile" feature 502, for example, the user's profile can be displayed, as shown in user interface (C). The user can select the feature 504 in the "Apps" section, which corresponds to "Music," in order to edit or link the media application. When the user selects the feature for "Music," user interface (D) can be displayed, which indicates to the user that the user can listen to music in the driver's vehicle. User interface (D) enables the user to add a media application (as shown by the "+" symbol).

When the user adds the application, called Music Application, for example, the user is provided with user interface (E), in which the user can input credentials for Music Application (e.g., specific to Music Application). The user can provide the user name and password for the account with the media service provider, Music Application, and select the "Allow" feature 506 to enable a driver's device to have access to the media associated with that account. For example, the process can correspond to an OAuth and sign up process for an on-demand music application. Once the user provides the credentials, the user is taken back to the home page or status page, as shown in user interface (F).

Figure 5B:
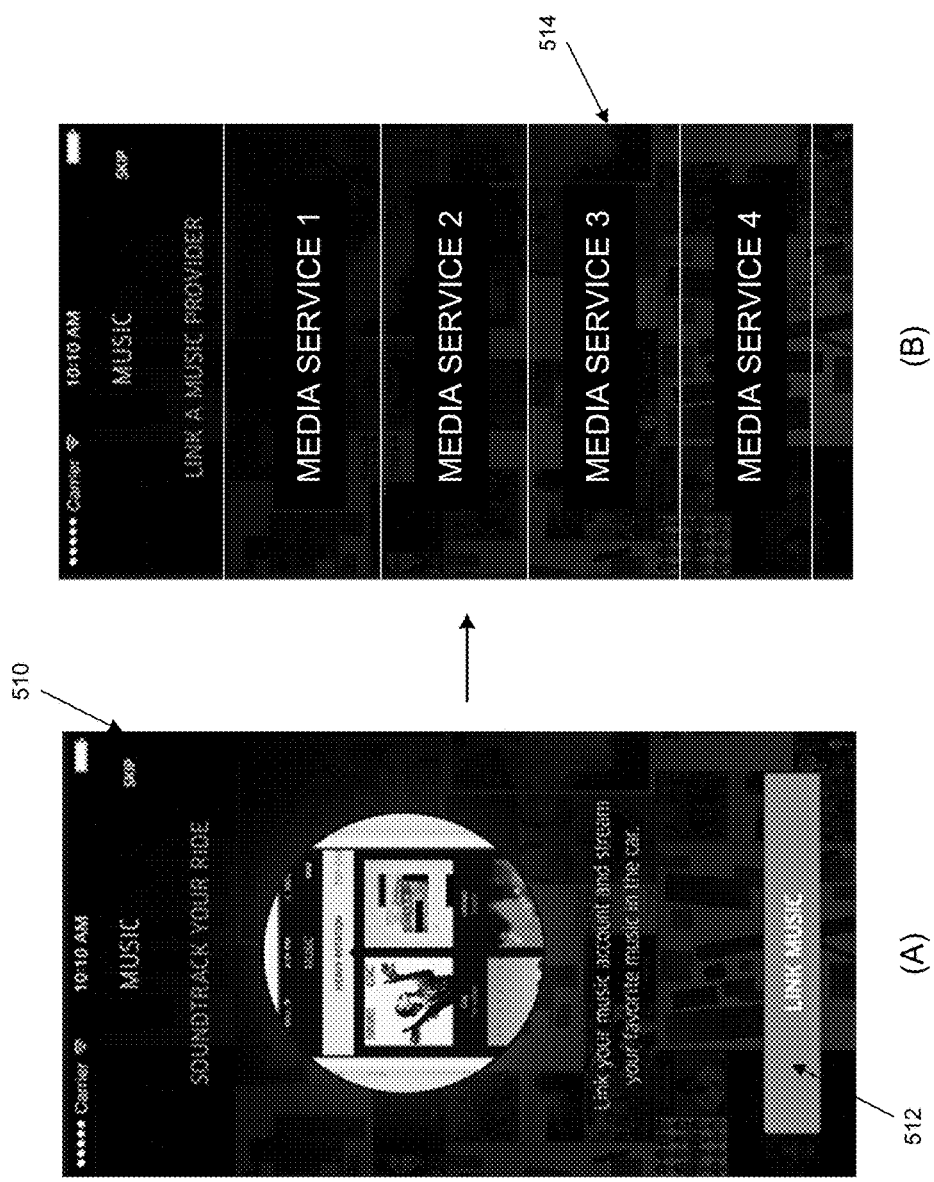

FIG. 5B illustrates other example user interfaces that are provided on a display of a user's mobile computing device to enable the user to sign up or subscribe to the media control feature for use with on-demand transport services. According to an example, user interface (A) can be provided by the designated client service application when the user first launches the designated client service application and/or when the media control feature is available to the user. The user can select the "skip" feature 510 if the user does not wish to link a media application with the designated client service application. On the other hand, if the user wants to link a media application with the designated client service application, the user can select the "Link Music" feature 512 to link the user's account with a media application for purposes of having media control during a transport service.

For example, selection of the "Link Music" feature 512 can cause the designated client service application to display user interface (B) of FIG. 5B, in which the user can select one or more media applications provided by one or more media service providers to link with the designated client service application. In the example of FIG. 5B, four different media service providers' names are provided as four different selectable features 514. The user can select one of the option features 514 to input credentials for that media application, such as illustrated in user interface (E) of FIG. 5A. The user can link the designated client service application with a plurality of different media service providers that the user has accounts with so that the use can select one of multiple media services when the user consumes media during a transport service.

Figure 6A:
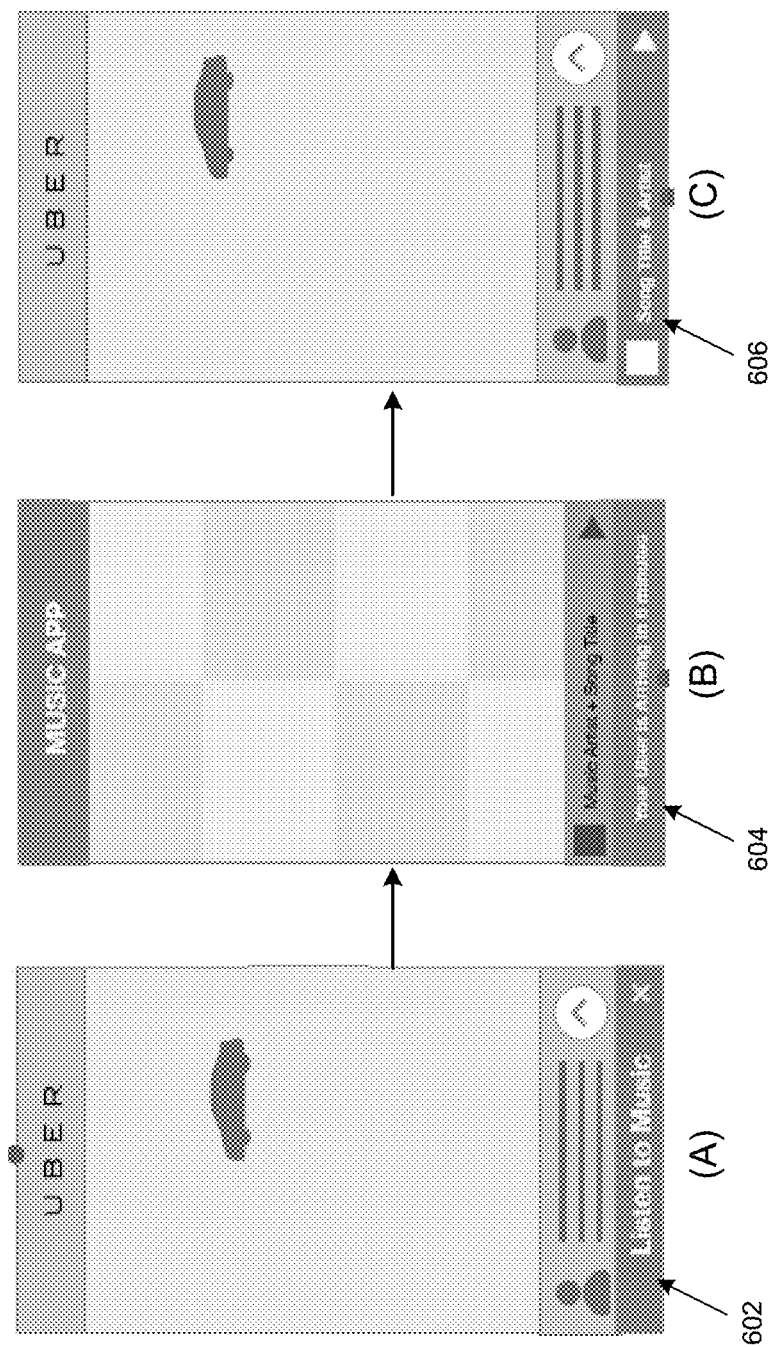
FIGS. 6A and 6B illustrate example user interfaces that are provided on a display of a user's mobile computing device to enable the user to toggle between a designated service application and a media application.

FIG. 6A illustrates example user interfaces that are provided on a display of a user's mobile computing device to enable the user to toggle or switch between a designated client service application and a media application. User interface (A) can correspond to user interface (D) of FIG. 4 or (F) of FIG. 5A, depending on implementation. In the example of FIG. 6A, the user has already requested a transport service and the service has been arranged for the user. The user has also requested media control. The user can interact with the "Listen to Music" feature 602 or another similar feature for media on user interface (A) to toggle or switch between the corresponding music application (that is linked to the designated client service application) and the client service application. For example, after selecting the "Listen to Music" feature 602 on user interface (A), user interface (B), which corresponds to a user interface of the music application, can be displayed.

The user can operate the media features on user interface (B) to control and select which song or playlist to consume. A status feature for the service application can be provided with the user interface of the music application, as illustrated by the "Your Uber is Arriving in 6 Minutes" feature 604 in FIG. 6A. Again, the user can select this feature 604 to toggle back to or to view the service application, as shown in user interface (C). In one example, user interface (C) can include media information 606, such as the name and/or artist, of the music or song being currently played. In some examples, the user interfaces shown in FIG. 6A can be shown before, during, or after the transport service.

During the transport service, the user can interact with the media application to control the media that is being played in the vehicle. As discussed above, the user can interact with the media application, which causes the driver's device to receive the media based on the user's input with the media application on the user's client device.

In other examples, the designated client service application can provide the media outputting service without use of a separate media application. In such examples, the user can select the "Listen to Music" feature 602 on user interface (A) of FIG. 6A to cause other features pertaining to the media to be displayed within the designated client service application. User interface (B) can be provided by the designated client service application, which can interface with the music application via an API or through use of a software development kit. The user can then interact with the designated client service application to control what is being outputted in the driver's vehicle via the driver's device.

Figure 6B:
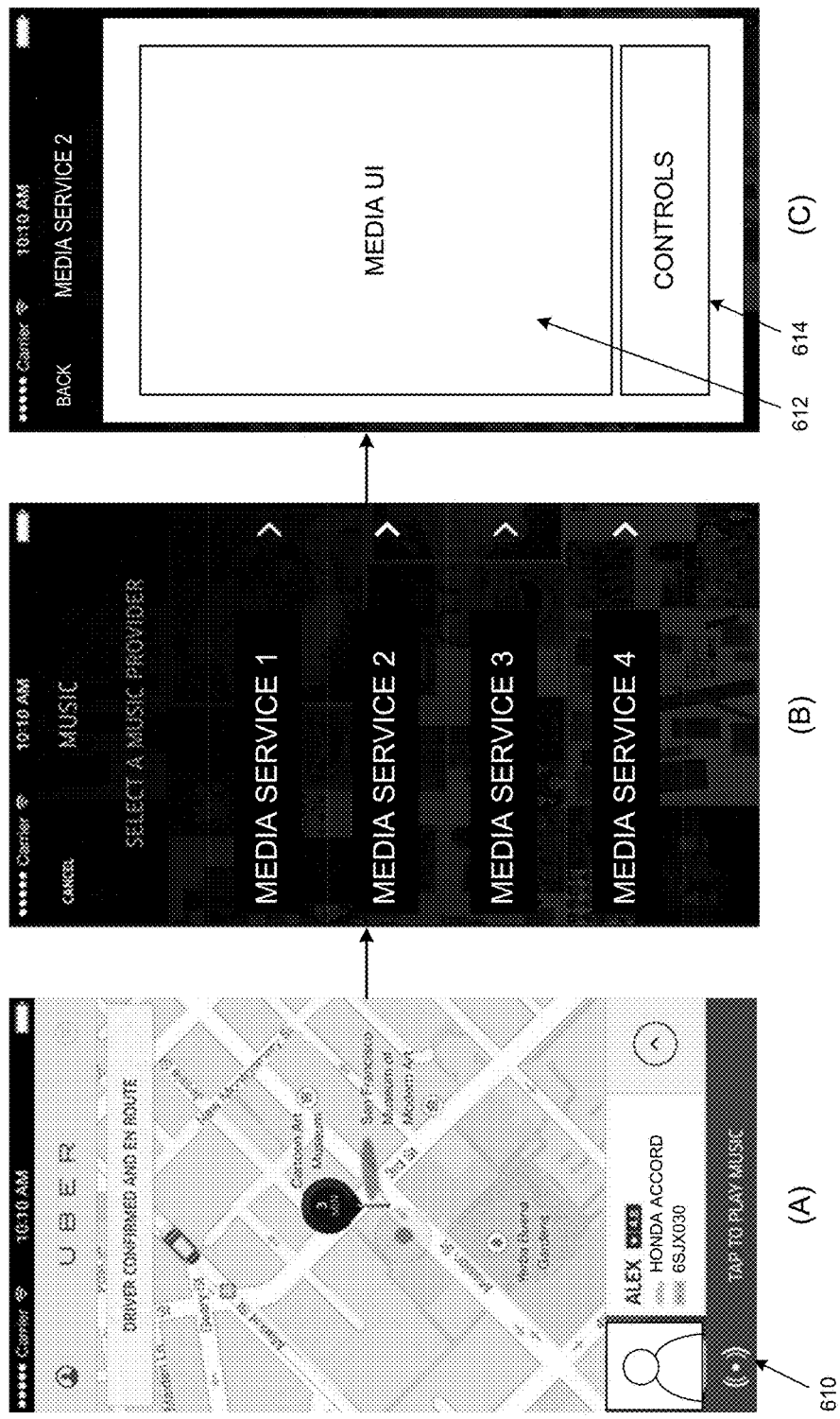

FIG. 6B illustrates other example user interfaces that are provided on a display of a user's mobile computing device to enable the user to toggle or switch between a designated client service application and a media application (or a user interface corresponding to the media application). In one example, like FIG. 6A, user interface (A) corresponds to an interface that is displayed after the user has already requested a transport service and the service has been arranged for the user. User interface (A) can include a selectable feature 610 to enable the user to control music to be played using his or her mobile computing device. According to an example, when the user selects the feature 610, user interface (B) can be displayed by the designated client service application to select one of the music service providers to play the music. A user may have an account with a plurality of different music service providers. Selection of one of the plurality of music service providers can cause a user interface associated with the selected music service provider to be displayed. The user interface can be provided by the music service provider's application that is stored on the user's mobile computing device or can be provided by the designated service application, such as illustrated in user interface (C). User interface (C) can display a media user interface 612 showing the media being played back, such as a list of songs in a playlist, an image of a song or an album, etc., along with controls 614 for playing and controlling the media being played back.

Figure 7:
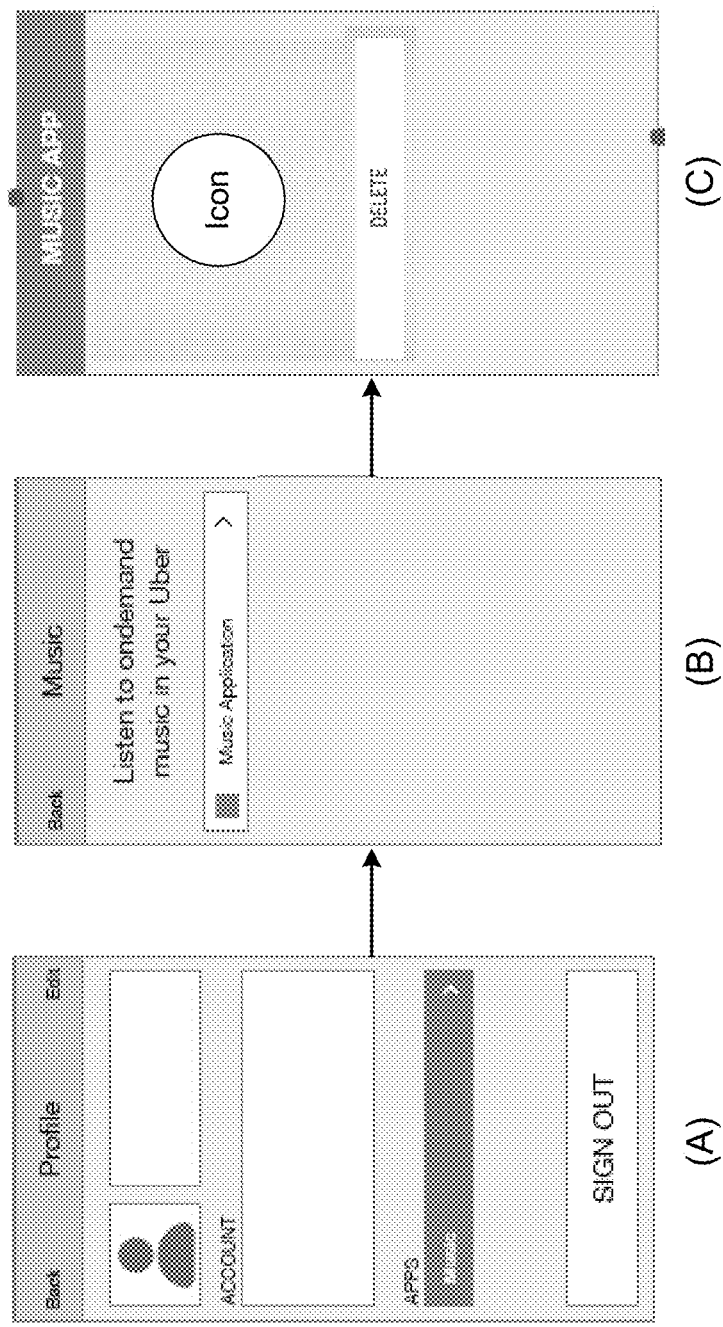
FIG. 7 illustrates example user interfaces that are provided on a display of a user's mobile computing device to enable the user to unsubscribe to the media control feature for use with on-demand transport services.

FIG. 7 illustrates example user interfaces that are provided on a display of a user's mobile computing device to enable the user to unsubscribe to the media control feature for use with on-demand transport services. User interface (A) shows the profile of the user, as discussed previously above. The user can unsubscribe to the media control feature by interacting with the profile. For example, as shown in user interface (B), the user can select the application, such as Music Application, and delete the credentials for that application, as shown in user interface (C).

Figure 8A:
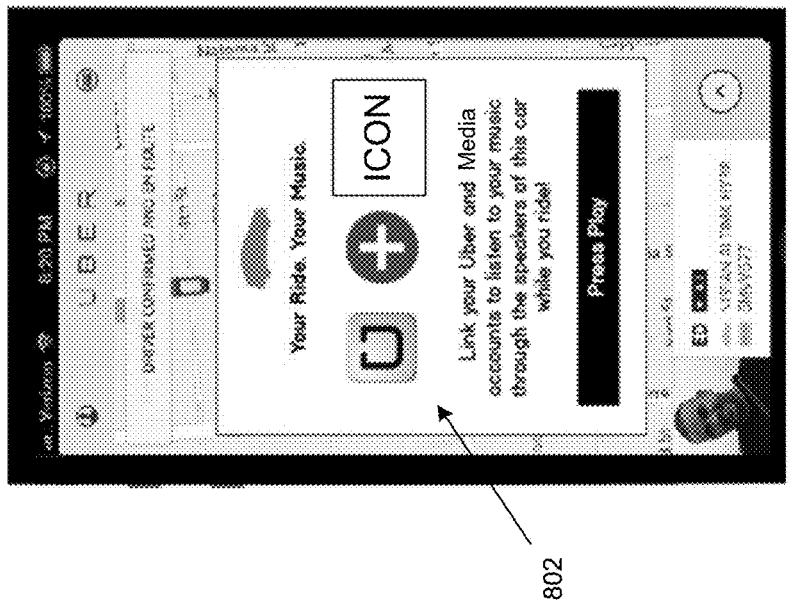
FIGS. 8A and 8B illustrate example user interfaces that are provided on a display of a user's mobile computing device to provide the user with information about the media control feature for use with on-demand transport services and to enable the user to sign up or subscribe to the media control feature.
Figure 8B:
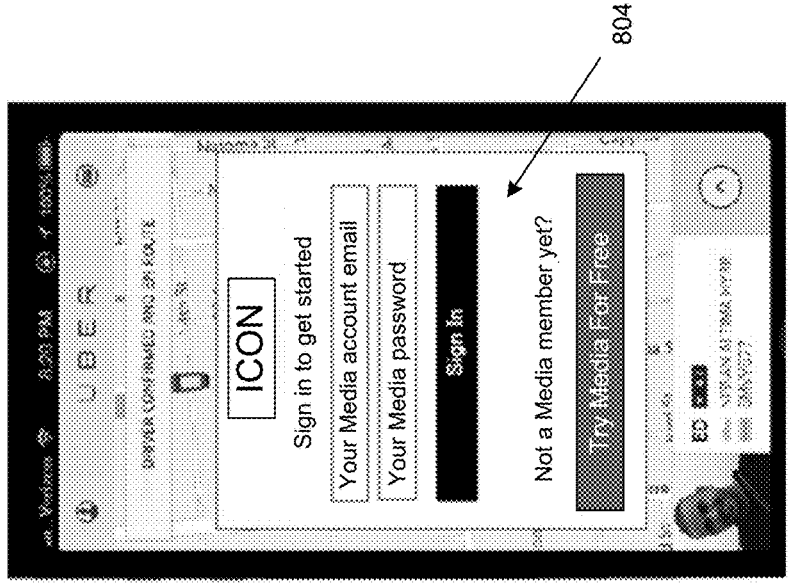

FIGS. 8A and 8B illustrate example user interfaces that are provided on a display of a user's mobile computing device to provide the user with information about the media control feature for use with on-demand transport services and to enable the user to sign up or subscribe to the media control feature. FIG. 8A illustrates an example of prompting a user or providing a notification 802 to the user via the client service application (e.g., as an in-application message) indicating that the user can link a media application with the client service application in order to have media control during the transport service. FIG. 8B illustrates another in-application message 804 (message within the client service application) that provides another mechanism for the user to link the media application (e.g., an application provided by and associated with a media service provider) with the client service application or subscribe to the media control feature. In this manner, the user does not have to access the profile (e.g., as illustrated in FIG. 5A) to provide credential information, but can provide the credentials directly from interacting with the media notification.

Hardware Diagram

Figure 9:
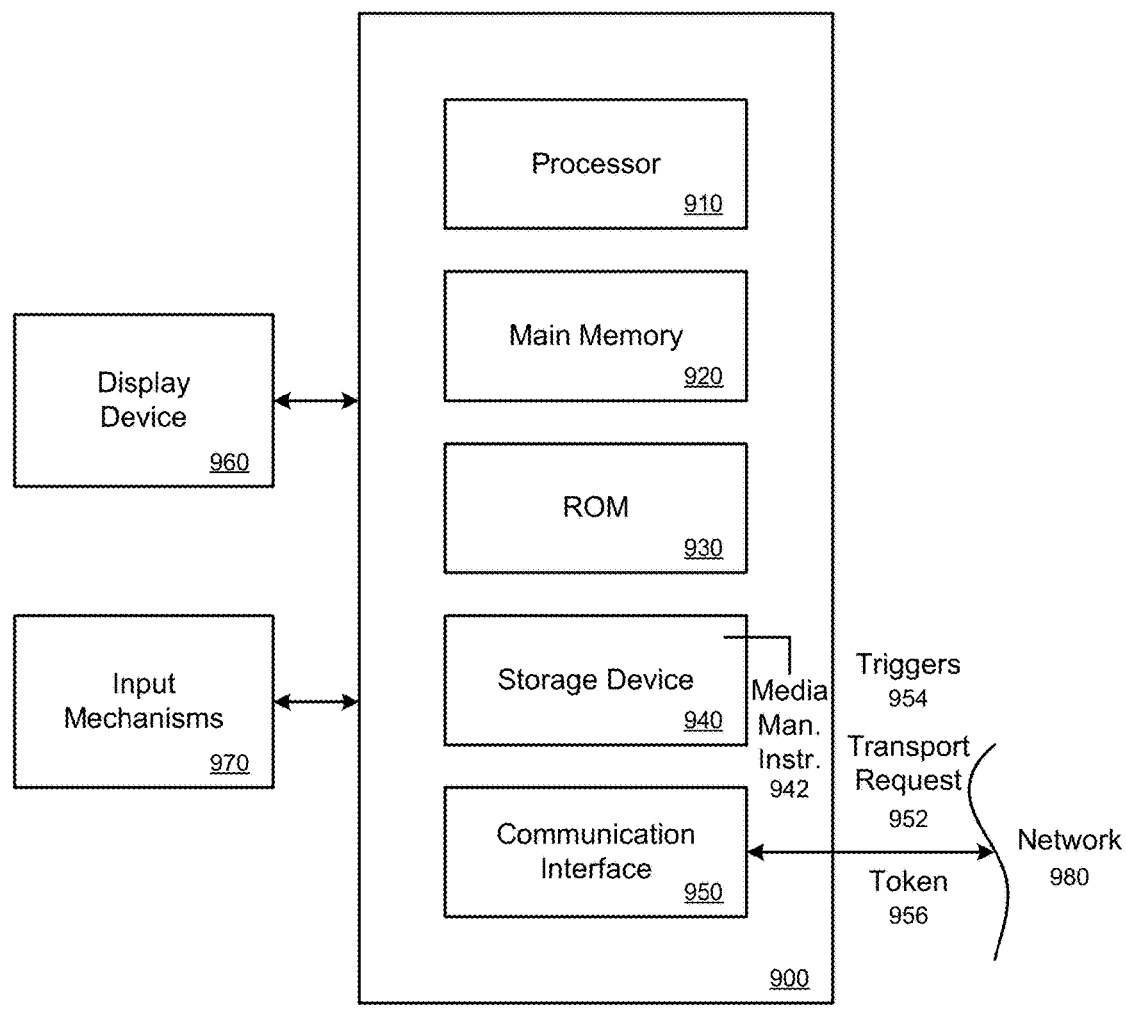
FIG. 9 is a block diagram that illustrates a computer system upon which examples described herein may be implemented.

FIG. 9 is a block diagram that illustrates a computer system upon which examples described herein may be implemented. For example, in the context of FIG. 1, the transport arrangement system may be implemented using a computer system such as described by FIG. 9. System 900 may also be implemented using a combination of multiple computer systems as described by FIG. 9.

In one implementation, computer system 900 includes processing resources, main memory, ROM, storage device, and communication interface. Computer system 900 includes at least one processor for processing information and a main memory, such as a random access memory (RAM) or other dynamic storage device, for storing information and instructions to be executed by the processor. Main memory also may be used for storing temporary variables or other intermediate information during execution of instructions to be executed by processor. Computer system 900 may also include a read only memory (ROM) or other static storage device for storing static information and instructions for processor. A storage device, such as a magnetic disk or optical disk, is provided for storing information and instructions. For example, the storage device can correspond to a computer-readable medium that stores media management instructions for performing operations discussed with respect to FIGS. 1 through 8B.

The communication interface can enable computer system 900 to communicate with one or more networks (e.g., cellular network) through use of the network link (wireless or via a wire). Using the network link, computer system can communicate with a plurality of devices, such as the mobile computing devices of the clients and service providers. According to some examples, computer system can receive a transport request from a user's mobile computing device via the network link and arrange a transport for the user. If media control is enabled for the user and the driver, the processor can provide a token to the driver's device to enable the driver's device to access media of the user's account with a media service provider. The processor can receive or determine triggers and provide the user with media control of the driver's device.

Computer system 900 can also include a display device, such as a cathode ray tube (CRT), an LCD monitor, or a television set, for example, for displaying graphics and information to a user. An input mechanism, such as a keyboard that includes alphanumeric keys and other keys, can be coupled to computer system for communicating information and command selections to processor. Other non-limiting, illustrative examples of input mechanisms include a mouse, a trackball, touch-sensitive screen, or cursor direction keys for communicating direction information and command selections to processor and for controlling cursor movement on display.

Examples described herein are related to the use of computer system 900 for implementing the techniques described herein. According to one example, those techniques are performed by computer system 900 in response to processor executing one or more sequences of one or more instructions contained in main memory, such as the price adjustment instructions. Such instructions may be read into main memory from another machine-readable medium, such as storage device. Execution of the sequences of instructions contained in main memory causes processor to perform the process steps described herein. In alternative implementations, hard-wired circuitry may be used in place of or in combination with software instructions to implement examples described herein. Thus, the examples described are not limited to any specific combination of hardware circuitry and software.

Figure 10:
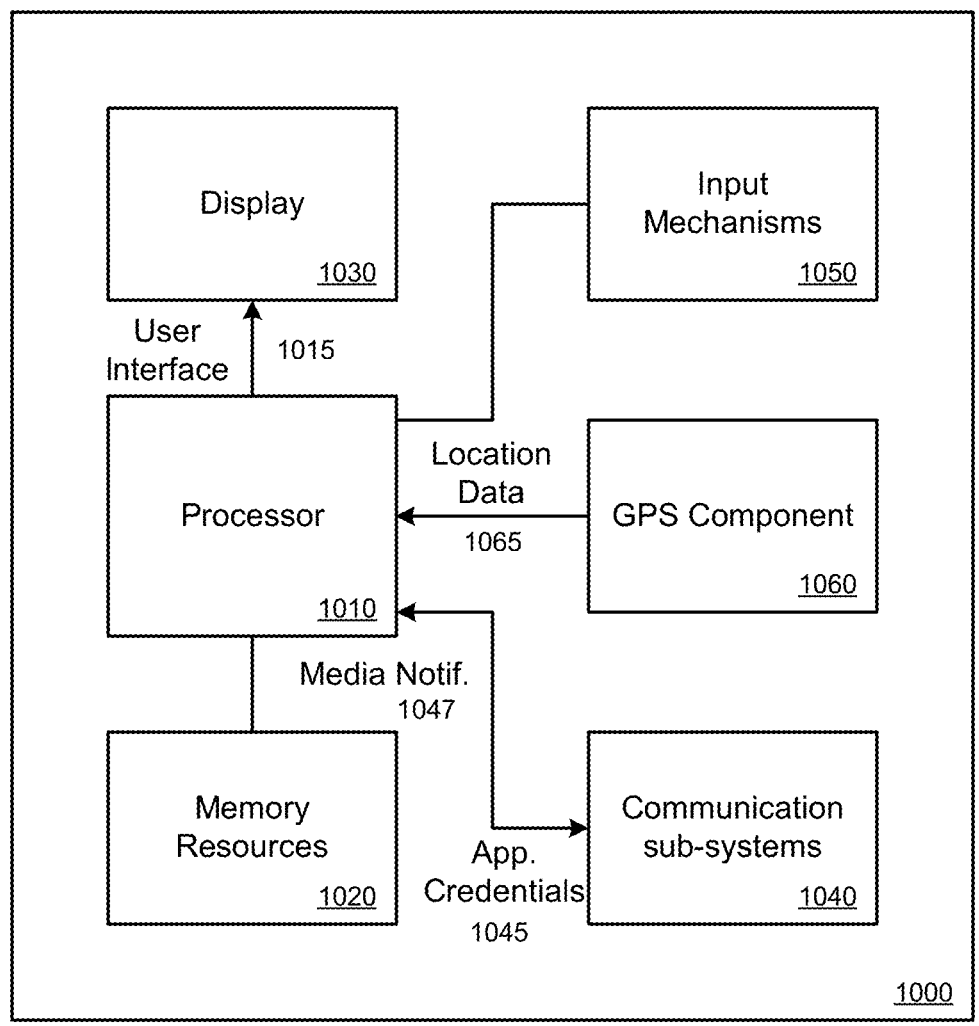
FIG. 10 is a block diagram that illustrates a mobile computing device upon which examples described herein may be implemented.

FIG. 10 is a block diagram that illustrates a mobile computing device upon which examples described herein may be implemented. In one example, a computing device 1000 may correspond to a mobile computing device, such as a cellular device that is capable of telephony, messaging, and data services. The computing device 1000 can correspond to a client device or a driver device. Examples of such devices include smartphones, handsets or tablet devices for cellular carriers. Computing device 1000 includes a processor, memory resources, a display device (e.g., such as a touch-sensitive display device), one or more communication sub-systems (including wireless communication sub-systems), input mechanisms (e.g., an input mechanism can include or be part of the touch-sensitive display device), and one or more location detection mechanisms (e.g., GPS component). In one example, at least one of the communication sub-systems sends and receives cellular data over data channels and voice channels.

The processor is configured with software and/or other logic to perform one or more processes, steps and other functions described with implementations, such as described by FIGS. 1 through 8B, and elsewhere in the application. Processor is configured, with instructions and data stored in the memory resources, to operate a designated service application as described in FIGS. 1 through 8B. For example, instructions for operating the service application in order to display user interfaces can be stored in the memory resources of the computing device 1000.

A service provider, for example, can operate a mobile computing device (such as a computing device 1000) to operate a designated service application. The GPS component can determine location information, such as current location information of the computing device 1000. The location information can be wirelessly transmitted to the system via the communication sub-systems periodically and/or as part of a status message. The computing device 1000, such as a client device, can receive a media notification notifying the user that the user can link or sync the designated service application with a media application in order to listen and/or view media through the speakers and/or display of the driver's vehicle during the duration of the transport service. In addition, application credentials for a user's account with a media provider can be provided to the system for use with media control.

For example, the processor can provide a variety of content to the display by executing instructions and/or applications that are stored in the memory resources. One or more user interfaces can be provided by the processor, such as the user interfaces for the designated service application. While FIG. 10 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for providing media output within transport vehicles, the method being performed by one or more servers of a transport arrangement service and comprising:
   remotely enabling a computing device of a user to control media output within a vehicle, using a device associated with a driver of the vehicle that is selected to provide the user with a transport service, wherein remotely enabling the computing device of the user includes performing, on the one or more servers, operations that include:
   selecting the driver to provide the transport service for the user;
   determining the user has requested to have control over media that is to be outputted from the device associated with the driver;
   identifying a token of the user;
   transmitting the token to the device associated with the driver, from which media output is to be initiated;
   monitoring position information from the device associated with the driver before initiation of the transport service;
   detecting, from the monitored position information, a first event that is associated with initiation of the transport service by the selected driver; and
   in response to detecting the first event, enabling the computing device of the user to initiate media output within the vehicle using the token and the device associated with the driver.

2. The method of claim 1, further comprising:
   determining, by accessing an account associated with the driver, that the driver has enabled the computing device of the user to control the device associated with the driver in providing media output within the vehicle.

3. The method of claim 2, wherein determining that the user has requested to control media output includes:
   providing, to the computing device of the user, a notification that the device associated with the driver has enabled a feature to enable user control of media output; and
   receiving, from the computing device of the user, a request to control media output.

4. The method of claim 1, wherein the user operates a media application stored on the computing device of the user to control media output, and wherein the token includes a user identifier and a password, the user identifier and the password each correspond to an account with a media service provider that provides the media application.

5. The method of claim 1, wherein detecting the first event includes:
   receiving data from a designated application operating on the device associated with the driver, the data from the designated application including at least a portion of the monitored position information and one or more indicators that the driver is about to initiate, or has initiated, the transport service.

6. The method of claim 1 further comprising:
monitoring position information from the computing device of the user before initiation of the transport service, wherein detecting the first event includes:
determining, from the monitored position information of the computing device of the user and the device associated with the driver, that the computing device of the user and the device associated with the driver are within a predefined distance from each other.

7. The method of claim 1, further comprising:
monitoring position information from the computing device of the user before initiation of the transport service, wherein detecting the first event includes:
receiving data from the computing device of the user and the device associated with the driver, the data including the monitored position information and one or more indicators that the transport service is about to initiate or has initiated.

8. The method of claim 1, further comprising:
detecting a second event; and
in response to detecting the second event, disabling the device associated with the driver from being able to provide media output under control of the computing device of the user.

9. The method of claim 8, wherein detecting the second event includes:
receiving, from a designated application operating on the device associated with the driver, an indication that the transport service has been completed.

10. The method of claim 9, wherein disabling the device associated with the driver includes:
transmitting instructions, to the device associated with the driver, to delete the token of the user.

11. A non-transitory computer-readable medium storing instructions that, when executed by a processor of a transport arrangement service, causes the transport arrangement service to:
remotely enable a computing device of a user to control media output within a vehicle, using a device associated with a driver of the vehicle that is selected to provide the user with a transport service, wherein enabling the computing device of the user includes:
select the driver to provide the transport service for the user;
determine the user has requested to have control over media that is to be outputted from the device associated with the driver;
identify a token of the user;
transmit the token to the device associated with the driver, from which media output is to be initiated;
monitor position information from the device associated with the driver before initiation of the transport service;
detect, from the monitored position information, a first event that is associated with initiation of the transport service by the selected driver; and
in response to detecting the first event, enable the computing device of the user to initiate media output within the vehicle using the token and the device associated with the driver.

12. The non-transitory computer-readable medium of claim 11, wherein the instructions further cause the processor of a transport arrangement service:
determine, by accessing an account associated with the driver, that the driver has enabled the user to control the device associated with the driver in providing media output within the vehicle.

13. The non-transitory computer-readable medium of claim 12, wherein the instructions that cause the transport arrangement service to determine that the user has requested to control media output, further include:
provide, to the computing device of the user, a notification that the device associated with the driver has enabled a feature to enable user control of media output; and
receive, from the computing device of the user, a request to control media output.

14. The non-transitory computer-readable medium of claim 11, wherein the user operates a media application stored on the computing device of the user to control media output, and wherein the token includes a user identifier and a password, the user identifier and the password each correspond to an account with a media service provider that provides the media application.

15. The non-transitory computer-readable medium of claim 11, wherein the instructions that cause the transport arrangement service to detect the first event include:
receive data from a designated application operating on the device associated with the driver, the data from the designated application including at least a portion of the monitored position information and one or more indicators that the driver is about to initiate, or has initiated, the transport service.

16. The non-transitory computer-readable medium of claim 11, wherein the instructions further cause the transport arrangement service to:
monitor position information from the computing device of the user before initiation of the transport service, and wherein the instructions further cause the transport arrangement service to detect the first event to further:
determine, from the monitored position information of the computing device of the user and the device associated with the driver, a current location of the computing device of the user and a current location of the device associated with the vehicle are within a predefined distance from each other.

17. The non-transitory computer-readable medium of claim 11, wherein the instructions further cause the transport arrangement service to:
monitor position information from the computing device of the user before initiation of the transport service, and wherein the instructions further cause the transport arrangement service to detect the first event to further:
receive data from the computing device of the user and the device associated with the driver, the data including the monitored position information and one or more indicators that the transport service is about to initiate or has initiated.

18. The non-transitory computer-readable medium of claim 11, wherein the instructions further cause the transport arrangement service:
detect a second event; and
in response to detecting the second event, disable the device associated with the driver being able to provide media output under control of the computing device of the user.

19. The non-transitory computer-readable medium of claim 18, wherein the instructions that cause the transport arrangement service to detect that the second event has occurred, further include:
receive, from a designated application operating on the device associated with the driver, an indication that the transport service has completed; and
transmitting instructions, to the device associated with the driver, to delete the token of the user.

20. A computing system, comprising:
a network interface;
a memory storing instructions; and
one or more processors, coupled to the network interface and the memory, to execute the instructions, the instructions causing a transport arrangement service to:
remotely enable a computing device of a user to control media output within a vehicle, using a device associated with a driver of the vehicle that is selected to provide the user with a transport service, wherein remotely enabling the device of the user includes:
select the driver to provide the transport service for the user;
determine the user has requested to have control over media that is to be outputted from the device associated with the driver;
identify a token of the user;
transmit the token to the device associated with the driver, from which media output is to be initiated;
monitor position information from the device associated with the driver before initiation of the transport service;
detect, from the monitored position information, a first event that is associated with initiation of the transport service by the selected driver; and
in response to detecting the first event, enable the computing device of the user to initiate media output within the vehicle using the token and the device associated with the driver.

* * * * *